United States Patent [19]

McCamy

[11] Patent Number: 5,533,615

[45] Date of Patent: Jul. 9, 1996

[54] DISC STORAGE CASE

[76] Inventor: William G. McCamy, 4353 Highbourne Dr., Marietta, Ga. 30066

[21] Appl. No.: 366,625

[22] Filed: Dec. 30, 1994

[51] Int. Cl.[6] .................................................. B65D 85/57
[52] U.S. Cl. ...................................... 206/308.1; 206/310
[58] Field of Search .................................. 206/307, 308.1, 206/308.3, 309, 310, 312

[56] References Cited

U.S. PATENT DOCUMENTS

| | | | |
|---|---|---|---|
| 774,037 | 11/1904 | Burgi . | |
| 4,641,747 | 2/1987 | Mestdagh et al. | 206/309 |
| 4,722,439 | 2/1988 | Grobecker et al. | 206/309 |
| 4,771,890 | 9/1988 | Hofland et al. | 206/308.1 |
| 4,805,770 | 2/1989 | Grobecker et al. | 206/308.1 |
| 4,867,302 | 9/1989 | Takahashi | 206/308.1 |
| 4,964,510 | 10/1990 | Loyd | 206/306 |
| 5,000,316 | 3/1991 | Lerner | 206/309 |
| 5,168,991 | 12/1992 | Whitehead et al. | 206/308.1 |
| 5,219,417 | 6/1993 | O'Brien et al. | 206/312 |
| 5,236,081 | 8/1993 | Fitzsimmons et al. | 206/44 R |

FOREIGN PATENT DOCUMENTS

| | | | |
|---|---|---|---|
| 302549 | 2/1989 | European Pat. Off. | 206/308.1 |
| 131182 | 1/1988 | Japan | 206/308.1 |

*Primary Examiner*—Jimmy G. Foster
*Attorney, Agent, or Firm*—Bernstein & Associates

[57] ABSTRACT

A container for storing a disc comprising a planar surface having a recessed receptacle therein, a first retention means comprising at least one lip projecting from the planar surface over the recess, and a second retention means comprising a pivotable lip attached to a button, the button being attached to a flexible tab, which in turn is attached to the planar surface. When the button is depressed, the moveable lip lifts away allowing the insertion or removal of a disc from the storage container.

11 Claims, 4 Drawing Sheets

DISC STORAGE CASE

FIELD OF THE INVENTION

The present invention relates to storage containers, and more particularly to a disc storage container which may be used to hold circular discs removably in place using a multiple point retention system. The invention further provides for the removal of a disc from the storage container by the use of a button and flexible tab.

BACKGROUND OF THE ART

Certain disc storage containers have heretofore been used to hold a variety of discs including compact discs, laser discs, information discs, and gramophone plates, saw blades, and the like. Such holders have relied on either a single point retention system consisting of a central "claw" holder or a multiple point retention system utilizing a bolt or latch system. These devices have not given their users the opportunity to control the actual release of the disc from the holder. The claw mechanism extends upward from a base surface usually somewhat larger than the diameter of the disc and provides a plurality of fingers pointed inwardly around a circle. A disc having a central hole therein is placed in the case and the hole is centered over the claw mechanism. The disc is manually pressed down over the claw thereby providing a friction retention fit. When the user wishes to remove the disc from the holder, he or she must grasp the edge of the disc in at least two places, usually on opposite sides of the disc, and pull upward to overcome the retaining friction of the claw mechanism. This mechanism has the drawback that the nature of the claw requires a necessarily tight fit with the center hole of the disc. A flexible compact disc can break if the hole size is slightly smaller than the holder designer has anticipated. Moreover, the claw teeth can break off under repeated use. Where a conventional claw retention mechanism is used with fragile discs this can result in damage to discs. Where a conventional circular saw blade is to be retained in the storage container, it may be painful to remove the disc by grasping the edge containing the teeth to overcome the friction fit of a claw mechanism on the center hole. Additionally, it is a very inconvenient mechanism where only one hand is usable, since typically, a user must hold the edge of the container with one hand and grasp opposite sides of the disc with at least two fingers of the other hand.

It would be desirable to have a disc storage container which could retain a disc by at least two points and permit removal of the disc without subjecting the disc to stress and where removal of the disc can be accomplished with minimal manual dexterity.

SUMMARY OF THE INVENTION

Generally described, the present invention provides a storage container for holding a disc. Rather than the conventional "claw" center that compresses to hold the center hole of a disc, this invention uses a multiple point retention system. The container has a planar surface with a circular recess defined therein capable of retaining a disc. At least one, and preferably two, peripheral lips at the periphery of a portion of the container extends over the recess and holds a disc when it is slipped under the peripheral lips.

A pivotable button is attached to the container at the periphery of the recess. The button on the top right portion has a lip which extends over the edge of the recess as well. The button is attached to the container by a vertical flexible tab on the underside of the button. The peripheral lips and the button lip act in concert to retain a disc within the recess. When depressed, the button tab flexes, causing the button lip to recede from over the edge of the recess, thereby permitting a disc that has been placed within the recess to be removed.

In use, a compact disc is placed in the container and slid under the peripheral lower lips. The button is then depressed, moving the button lip back and down slightly, but enough so that the disc can fit under the button lip. The button is then released, moving the button lip back over the disc and preventing its removal from the case.

A center rim extends upward from the container bottom and supports the disc in place.

A preferred embodiment of the present invention comprises a three point retention system. Three lips hold a disc in place by covering the peripheral edge of a disc. Two of the lips are stationary while the third is moveable to allow for the placement or removal of a disc from the container. The moveable lip is operated by a button mechanism attached to the container by a vertical tab on the button underside. An optional stop, also located on the underside of the button underside, prevents overflexion of the button tab.

Accordingly, it is a principal object of the present invention to provide a multiple point retention system for holding a compact disc in a case.

It is an additional object of the present invention to provide a manual control mechanism for retaining and releasing a compact disc in a case.

It is a further object of the present invention to provide a manual opening mechanism on a disc storage container which requires little manual dexterity.

It is still another object of the present invention to provide a disc storage system that retains the disc in place by peripheral retention lips rather than by a friction fit.

It is still another object of the present invention to provide a disc storage system that can easily allow the retention and removal of a disc with negligible risk of disc breakage.

Other objects, features, and advantages of the present invention will become apparent upon reading the following detailed description of embodiments of the invention, when taken in conjunction with the accompanying drawings and the appended claims.

BRIEF DESCRIPTION OF THE DRAWINGS

The invention is illustrated in the drawings in which like reference characters designate the same or similar parts throughout the figures of which.

DESCRIPTION OF THE PREFERRED EMBODIMENTS

Figure 2:
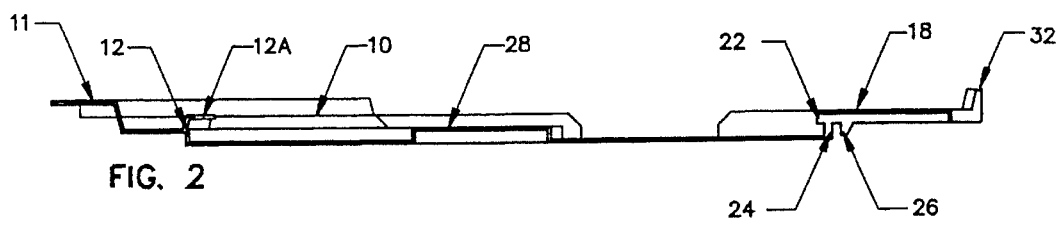
FIG. 2 is a side cross sectional view of a disc storage container along line A of FIG. 1.
Figure 1:
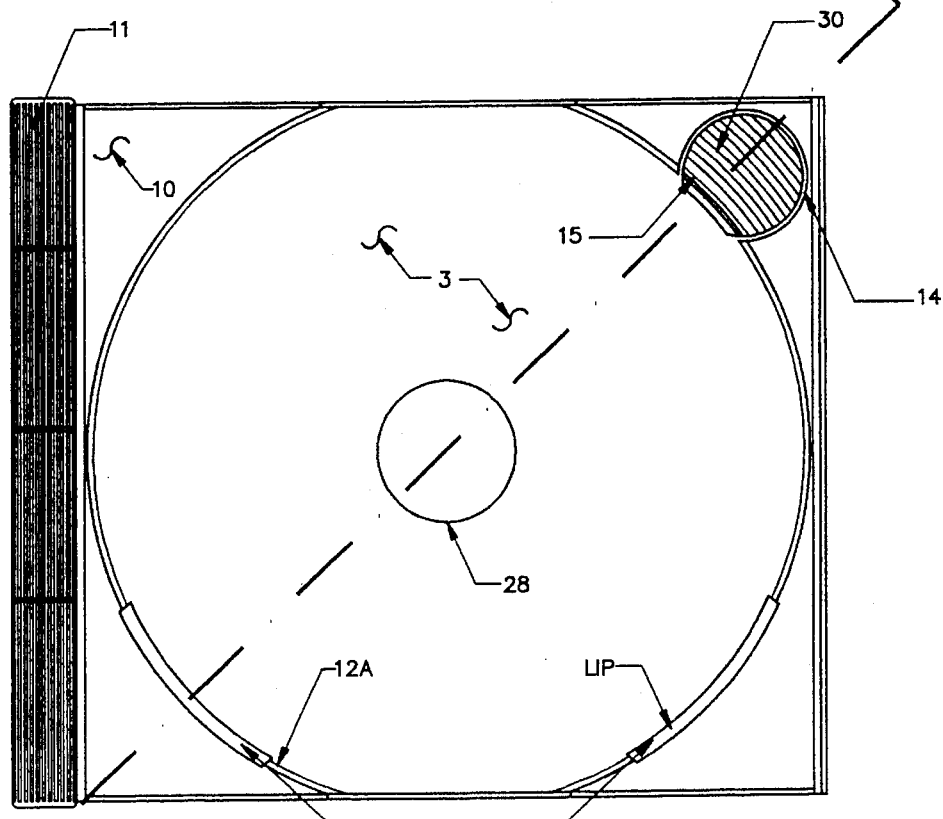
FIG. 1 is a top plan view of a disc storage container according to the present invention.
Figure 3:
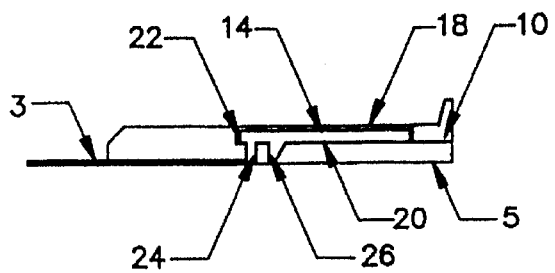
FIG. 3 is a side elevational detail view of the button mechanism of the preferred embodiment of the present invention.

Referring to the drawings and particularly to disc storage container 5 in FIGS. 1–4, a disc 2 can be removably retained within a disc storage container 5 having a planar surface 10 which defines a generally co-planar recessed receptacle 3 for holding a disc 2. The disc 2 can be any rigid or semi-rigid disc-shaped object, including, but not limited to laser discs, compact discs, gramophone and record discs, informational discs, saw blades, and the like. In the present example, the contemplated disc is a standard audio or data compact disc 2. The recessed receptacle 3 is necessarily slightly larger in diameter than the disc 2 retained therein. A grip 11 is an extension of planar surface 10 and is positioned along one edge of the container 5. In a preferred embodiment, grip 11 has a textured surface for easy grasping.

Figure 5:
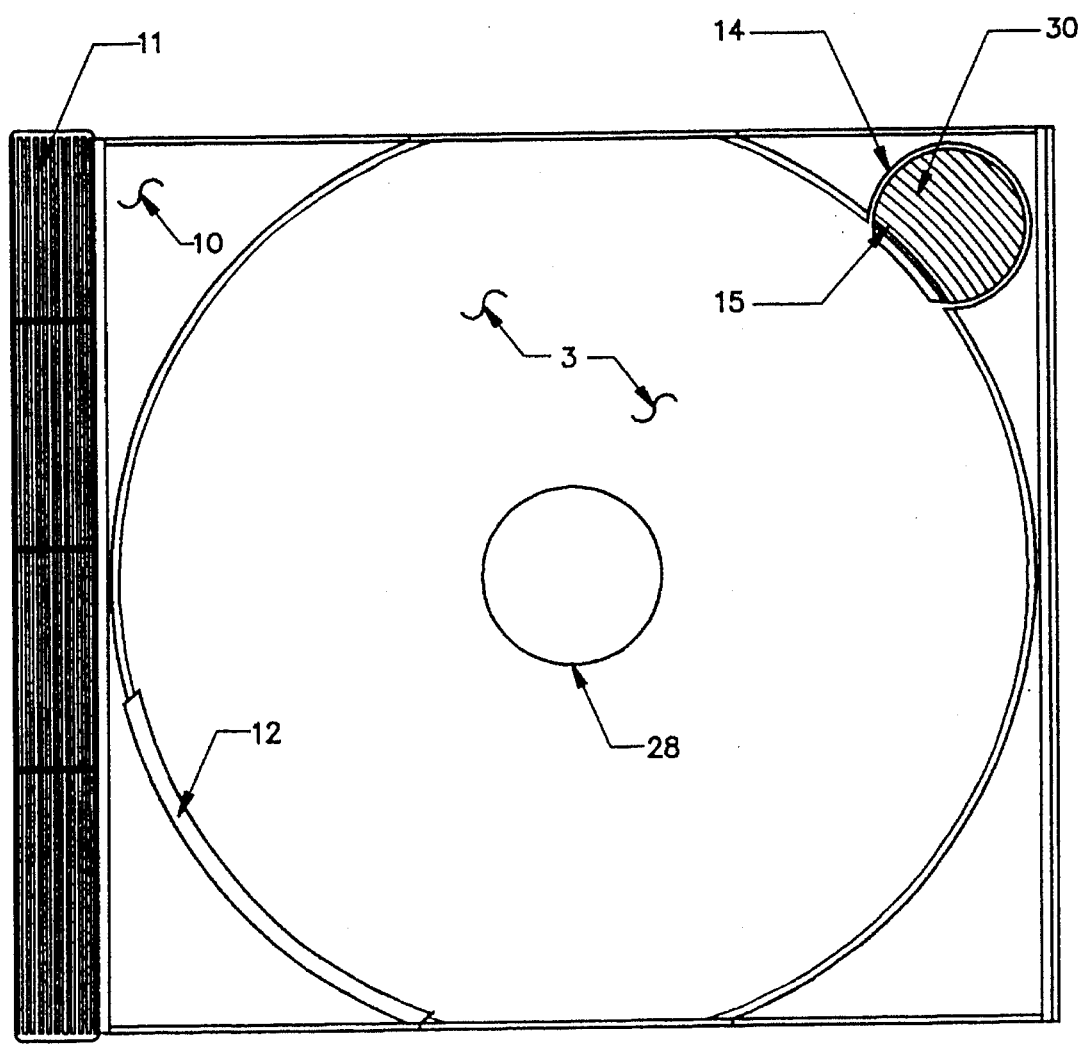
FIG. 5 is a top plan view of an alternative embodiment of the present invention showing a single fixed lip.

At least one, and preferably two or more fixed retention means, in the form of lips 12, extend upward from planar surface 10 and a portion 12A of the lip 12 extends over the recessed receptacle 3. In a preferred embodiment, the planar surface 10, grip 11 and lips 12 are injection molded plastic. In one embodiment the lips 12 can number two or more. In an alterative embodiment shown in FIG. 5, the lip 12A can be combined to form one continuous lip disposed partially around the perimeter of the recessed receptacle 3. These lips hold a portion of a disc 2 as it is slipped under them and into the recessed receptacle. In the preferred embodiment, there are two fixed retention lips 12.

A button 14 is positioned abutting the recessed receptacle 3 and disposed within a recess 15 in planar surface 10. The button has a top surface 18 and a bottom surface 20. The button also has a moveable front edge 22 which extends over the recess. In the preferred embodiment button 14 is opposite the retention lips 12.

Figure 6:
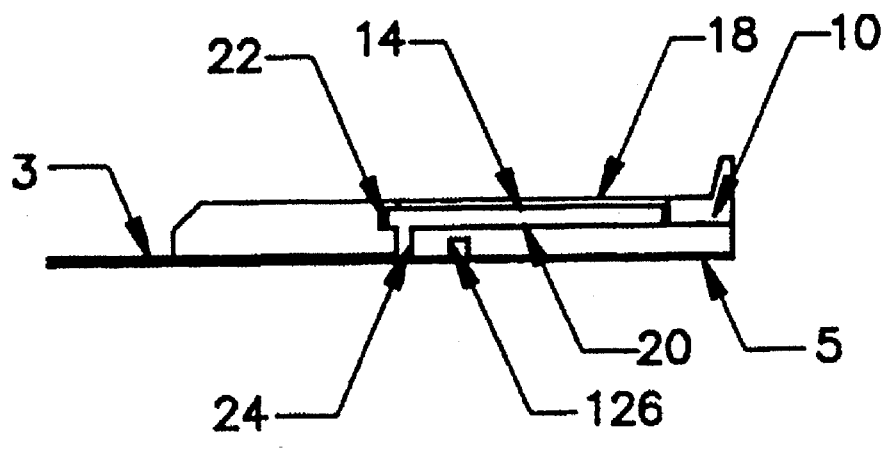
FIG. 6 is a side elevational view of the button mechanism of an alternative embodiment of the present invention.
Figure 7:
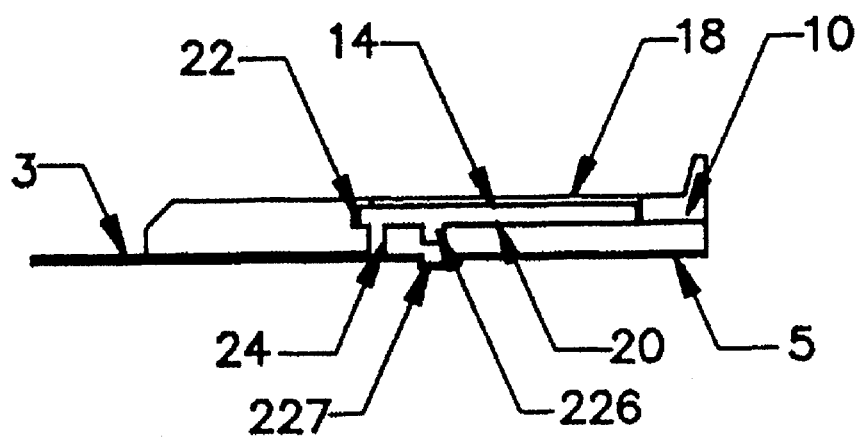
FIG. 7 is a side elevational view of the button mechanism of a second alternative embodiment of the present invention

A tab 24 is a projection extending from the button bottom surface 20 and attached to the planar surface 10. The tab 24 permits flexion of the button 14 with respect to the planar surface 10. Tab 24 is resiliently flexible, and therefore maintains button 14 in a coplanar orientation to planar surface 10. In a preferred embodiment a second projection forming a stop 26 extends from button bottom surface 20 towards the planar surface 10. The stop 26 is shorter in height than the tab 24. While it is not shown, it can be contemplated that the stop 26 can alternatively extend from the planar surface 10 toward the button bottom surface 20 without actually touching that surface (as shown in FIG. 6). Alternatively, as shown in FIG. 7, a stop 226 may be of the same height as tab 24, but planar surface 10 may alternatively have an indentation 227 to receive the longer stop 26. It is to be understood that the stop 26 is not critical for functioning of the present invention and can be omitted if desired.

Preferably, a projection 28 extends upward from the center of the recessed receptacle 3 to support a disc 2 above the floor of the recessed receptacle 3. The projection 28 is not critical to the function of the invention, and may be omitted if desired.

In a preferred embodiment, button top surface 18 has a textured surface, indicated by ridges 30, to aid in grasping button 14.

Figure 4:
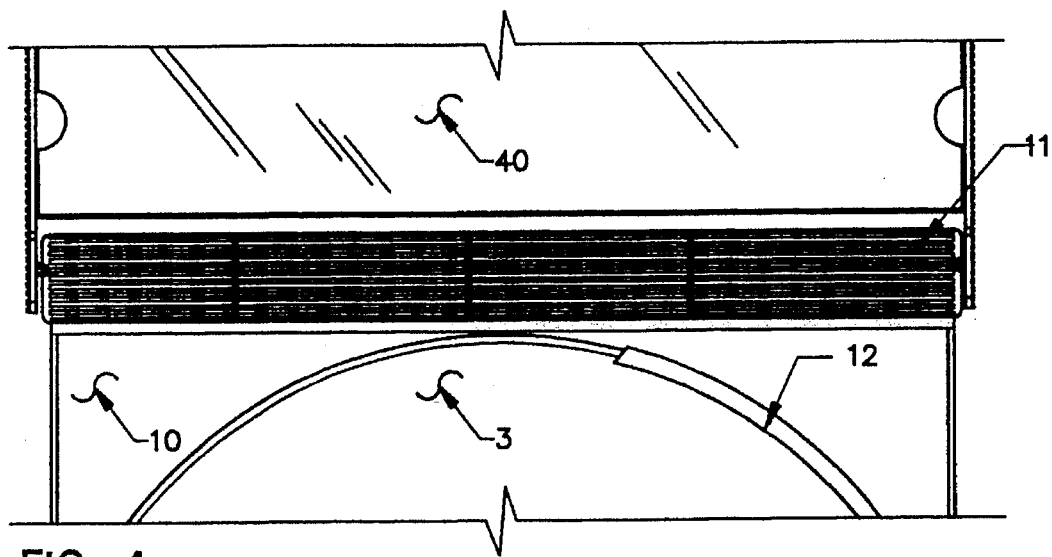
FIG. 4 is a top plan view in partial cutaway showing the cover as hingedly attached to the container.
Figure 4A:
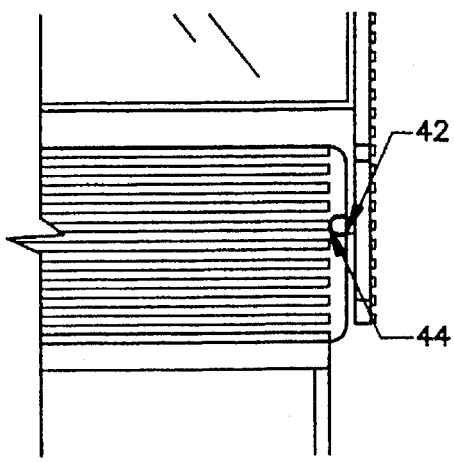
FIG. 4A is a detail view of a portion of FIG. 4.

As shown in FIGS. 4 and 4A, a cover 40 is hingedly mounted to one edge of the container surface 10 by a set of tabs 42 that fit within a set of recesses 44 in the planar surface 10. In a preferred embodiment, the components of the invention are injection molded plastic. Other materials, such as ceramics, wood, metal, and the like are possible.

In use, a user holds a disc 2 and inserts it under the lips 12 and into the recessed receptacle 3. The user then presses downward slightly on the corner of the disc 2 in the vicinity of the button 14. As button 14 is depressed downward, the tab 24 flexes, causing lip 22 to pivot slightly up and away from planar surface 10 allowing a disc 2 to be slid in or removed from under fixed retention lips 12 and moveable front edge 22. The stop projection 26 acts to limit the downward motion of button 14 as it is depressed and prevents over flexion and breakage of the tab 24. As button 14 is released, front edge 22 moves back over the disc 2, preventing its removal from the disc storage container 5. Resilient tab 24 returns button 14 to its coplanar position. A disc 2 is therefore held in the recessed receptacle 3 in planar surface 10 by at least two, but preferably three retention means.

An advantage of the present invention is that there is no stress placed on the disc when removing it from the container 5. Furthermore, a user can conveniently operate the button release mechanism 24 and cause release of the disc in the lap or onto a table with only one hand.

While the invention has been described in connection with certain preferred embodiments, it is not intended to limit the scope of the invention to the particular forms set forth, but, on the contrary, it is intended to cover such alternatives, modifications, and equivalents as may be included within the spirit and scope of the invention as defined by the appended claims.

Claimed is:

1. A holder for removably storing a disc, comprising:
   a container having top, bottom, left and right sides, a top planar surface and a bottom planar surface, said top planar surface having a recessed receptacle defined therein capable of receiving a disc-shaped object;
   a first retention means associated within said top planar surface for retaining said disc, comprising at least one lip projecting from said top planar surface partially over said recess and extending partially around the circumference of said receptacle;
   a second retention means proximate to said receptacle for retaining said disc comprising,
      a button having generally flat top and bottom surfaces, a front edge protruding over said recess and a rear edge, and a stop extending downward from said button bottom surface; and
      a flexible tab extending downwardly from said bottom surface of said button and attached to said planar surface.

2. The apparatus of claim 1, further comprising a projection extending upwardly from said top planar surface capable of supporting said disc in said receptacle.

3. The apparatus of claim 1, wherein said first retention means is positioned generally across said planar surface from said top second retention means.

4. The apparatus of claim 1, wherein said first retention means comprises a single lip.

5. The apparatus of claim 1, wherein said first retention means comprises a plurality of lips.

6. The apparatus of claim 1, wherein said button top surface is textured.

7. The apparatus of claim 1, further comprising a cover comprising a lid having four sides and a top and bottom surface and having a pair of side walls extending parallel from two of said sides, each side wall having an inwardly extending protrusion capable of matingly being received within a corresponding pair of indentations in said top and bottom sides of said container, whereby when said protrusions are frictionally engaged with said indentations, said indentations form a pivot point around which said cover can pivot to cover said container top surface.

8. A holder for removably storing a disc, comprising:

a container having top, bottom, left and right sides, a top planar surface and a bottom planar surface, said top planar surface having a recessed receptacle defined therein capable of receiving a disc-shaped object;

a first retention means associated within said top planar surface for retaining said disc, comprising at least one lip projecting from said top planar surface partially over said recess and extending partially around the circumference of said receptacle;

a second retention means proximate to said receptacle for retaining said disc comprising,
   a button having generally flat top and bottom surfaces, a front edge protruding over said recess and a rear edge, and a stop extending upward from said top planar surface, said stop capable of preventing overflexion of said button; and
   a flexible tab extending downwardly from said bottom surface of said button and attached to said planar surface.

9. A holder for storing a disc, comprising:

a planar surface having a recessed receptacle defined therein capable of receiving a disc-shaped object and a projection extending upwardly from said planar surface capable of supporting said disc in said receptacle;

a first retention means associated within said planar surface for retaining said disc, comprising a pair of lips projecting from said planar surface partially over said recess and extending partially around the circumference of said receptacle;

a second retention means proximate to said receptacle for retaining said disc in conjunction with said first retention means comprising, a button having generally flat top and bottom surfaces, a front edge partially protruding over the edge of said receptacle and a rear edge, a flexible tab extending downwardly from said bottom surface of said button and attached to said planar surface, said tab permitting said button to pivot, and and a stop comprising a post extending downward from said bottom surface toward said planar surface for preventing overflexion of said flexible tab.

10. The apparatus of claim 9, wherein said button top surface is textured.

11. The apparatus of claim 9, further comprising a cover comprising a lid having four sides and a top and bottom surface and having a pair of side walls extending parallel from two of said sides, each side wall having an inwardly extending protrusion capable of matingly being received within a corresponding pair of indentations in said top and bottom sides of said container, whereby when said protrusions are frictionally engaged with said indentations, the tab/indentations form a pivot point around which said cover can pivot to cover said container top surface.

* * * * *